US008559416B2

(12) United States Patent
Desai et al.

(10) Patent No.: US 8,559,416 B2
(45) Date of Patent: Oct. 15, 2013

(54) SYSTEM FOR AND METHOD OF INFORMATION ENCODING

(75) Inventors: Prashant B. Desai, Land O'Lakes, FL (US); Juan M. Vasquez, Gibsonton, FL (US); Mayuresh Mohan Hegde, Irving, TX (US); Parind S. Poi, Lewisville, TX (US); Haridas B. Bhogade, Plant City, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 792 days.

(21) Appl. No.: 12/564,439

(22) Filed: Sep. 22, 2009

(65) Prior Publication Data

US 2011/0069700 A1    Mar. 24, 2011

(51) Int. Cl.
*H04L 12/66* (2006.01)
(52) U.S. Cl.
USPC .......................................................... 370/352
(58) Field of Classification Search
USPC ............ 370/469, 467, 493, 352–356; 379/45, 379/221
See application file for complete search history.

(56) References Cited

U.S. PATENT DOCUMENTS

| | | | | |
|---|---|---|---|---|
| 6,678,735 | B1* | 1/2004 | Orton et al. | 709/230 |
| 7,451,229 | B2* | 11/2008 | Klemets et al. | 709/236 |
| 7,684,553 | B2* | 3/2010 | Wallenius et al. | 379/219 |
| 7,849,144 | B2* | 12/2010 | Prajapat et al. | 709/206 |
| 2003/0165231 | A1* | 9/2003 | Singh et al. | 379/265.09 |
| 2004/0107238 | A1* | 6/2004 | Orton et al. | 709/200 |
| 2005/0259796 | A1* | 11/2005 | Wallenius et al. | 379/93.01 |
| 2006/0174014 | A1* | 8/2006 | Bae | 709/227 |
| 2007/0299983 | A1* | 12/2007 | Brothers | 709/231 |
| 2008/0188250 | A1* | 8/2008 | Agarwal et al. | 455/466 |
| 2008/0256353 | A1* | 10/2008 | Hung et al. | 713/151 |
| 2008/0298309 | A1* | 12/2008 | DePietro et al. | 370/328 |
| 2009/0003570 | A1* | 1/2009 | Sindhwani et al. | 379/157 |
| 2009/0129388 | A1* | 5/2009 | Akhtar et al. | 370/392 |
| 2009/0187398 | A1* | 7/2009 | Wrobel | 704/8 |
| 2011/0022417 | A1* | 1/2011 | Rao | 705/4 |
| 2011/0038259 | A1* | 2/2011 | Bharrat et al. | 370/230 |
| 2011/0040881 | A1* | 2/2011 | Coulas et al. | 709/227 |
| 2012/0044932 | A1* | 2/2012 | Sidhu et al. | 370/353 |
| 2013/0114467 | A1* | 5/2013 | Gilleland | 370/259 |

* cited by examiner

*Primary Examiner* — Asad Nawaz
*Assistant Examiner* — Syed S Ali

(57) ABSTRACT

A system for and method of information encoding is presented. The system and method include encoding information within other information of a protocol, and then decoding the information and performing actions based on the decoded information.

15 Claims, 5 Drawing Sheets

SYSTEM FOR AND METHOD OF INFORMATION ENCODING

BACKGROUND INFORMATION

Session Initiation Protocol (SIP) is a call control signaling protocol for Internet Protocol (IP) networks. SIP is designed to be device-agnostic—that is, it is intended to provide a highly flexible call signaling capability that is not tailored to the capabilities of any particular device and/or vendor. Many call center software solutions are not device-agnostic or vendor-agnostic, and may require that the same vendor and/or devices are used throughout the network to maintain proprietary protocols.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

Systems and methods for encoding information within other information of a protocol, and then decoding the information and performing actions based on the decoded information, are shown. An encoding system may be in communication with a SIP device. The encoding system may request that information be input into the SIP device. The information may be transmitted to the encoding system, and the encoding system may encode the information in the header of a protocol request. The protocol request and the header may be transmitted to other systems associated with a network, and may be received by a decoding system. The decoding system may decode the information in the header of the protocol request, and may take one or more actions based on the information decoded from the header of the protocol request.

Figure 1:
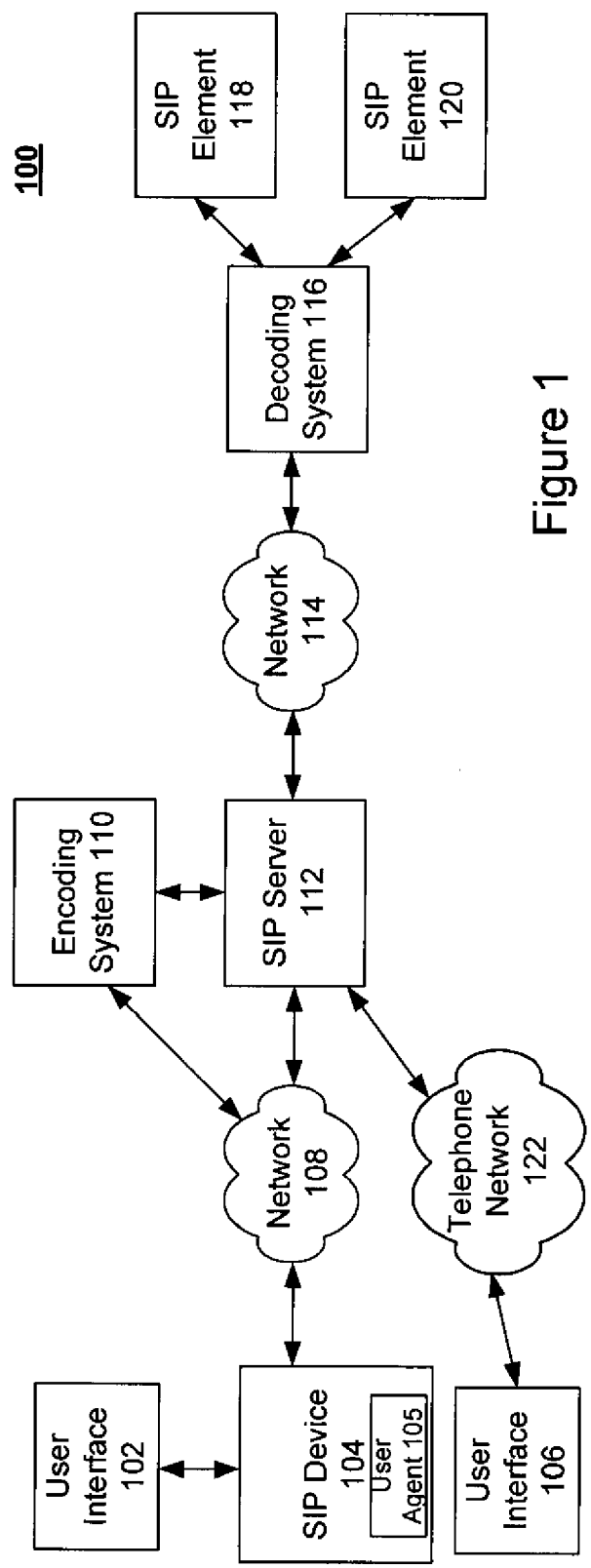
FIG. 1 is a schematic diagram illustrating a system according to particular embodiment.

FIG. 1 is a schematic diagram illustrating a system according to particular embodiments. System 100 illustrates an exemplary system for supporting SIP header encoding in SIP communication.

As illustrated, a SIP device 104 may be coupled to a user interface 102. The SIP device 104 may communicate with an encoding system 110 via a network. A user interface 106 may also interface with the encoding system 110 via a telephone network 122. The SIP device 104 and the user interface 102 may be, for example, a voice over Internet Protocol ("VoIP") telephone or other communication software that enables VoIP communication. The SIP device 104 may represent a device that manages the user interface 102. The user interface 102 may include a traditional telephone and other data communication device using voiceband or other signaling, including but not limited to data modems, facsimile devices, teletype (TTY) equipment, etc. The SIP device 104 may contain a SIP user agent. The SIP user agent may be integrated with the SIP device 104 or remote from the SIP device 104. The SIP user agent may perform interworking between SIP signaling and user interface actions. For example, the SIP user agent may manage an exchange of media (e.g., audio, etc.) between the user interface and a Real Time Protocol (RTP) media stream of a media session set up by the SIP signaling. The SIP device 104 may originate calls to and receive calls from other users. The SIP device 104 may communicate through network to SIP server 112.

The SIP server 112 may provide communication to other SIP devices, as shown by SIP element 118 and SIP element 120, through the network 114. The various components of system 100 may be further duplicated, combined and/or integrated to support various applications and platforms. Additional elements may also be implemented in the system to support various applications. A SIP-based network may also include an IP network, packet switched based network, or other type of network. The elements referred to in the Figures may include other network or packet switched based elements. For example, the elements referred to as "SIP" may include other network devices, elements, components, etc.

The SIP server 112 may represent a SIP proxy or application server that acts on behalf of the SIP device 104. For example, the SIP server 112 may manage a SIP Address of Record (AOR) on behalf of the SIP device 104. The SIP device 104 may register with the SIP server 112 and send SIP signaling through the SIP server 112 to other SIP elements, such as SIP Element 118 and SIP Element 120. For example, a call to the SIP AOR may be delivered to the SIP server 112, which in turn delivers the call to SIP device 104. The SIP server 112 may perform some service on behalf of the SIP device 104, or may forward SIP messages to and from the SIP device 104. The SIP device 104 may also communicate through the network 108 to SIP Element 118 and/or SIP Element 120.

An encoding system 110 may interface with the SIP server 112, and may operate to encode information into a header in the SIP request from the SIP device 104. The SIP header may include information associated with the SIP request, including sending IP address and receiving IP address, or other information. The SIP header may also include empty or blank space such that additional information may be encoded in the SIP header. The encoding system 110 may encode information provided by the SIP device 104, or may encode information provided by a user using the SIP device 104. For example, the SIP device 104 may include settings and/or commands such that information is encoded into a SIP request to be sent to the SIP server 112. Or the encoding system 110 may request information from the SIP device 104 and/or the user, and the user may input the information into the SIP device 104 via the user interface. The information may be transmitted to the encoding system 110 and may be incorporated into the SIP header of a SIP request. The SIP request may then be transmitted to the SIP server 112 and/or directly to a decoding system 116. In an embodiment, the SIP server 112 and the encoding system 110 reside on the same physical system. In another embodiment, the SIP server 112 and the encoding system 110 reside on different physical systems in communication with each other.

The decoding system 116 may receive a SIP request, and may decode the header information in the SIP request. The SIP header information may include preferences from the user and/or the SIP device 104. For example, the user may request to interact in a particular language. The language preference information may be encoded in the SIP header, for example, in the form of a language code. The decoding system 116 may interpret the information and route the SIP request to a SIP element corresponding to an operator who can interact with the user in the particular language. Or the decoding system 116 may play or transmit a specific greeting according to the information received in the SIP header.

SIP element 118 and SIP element 120 may be, for example, similar to the SIP device 104 and user interface. SIP element 118 and SIP element 120 may, for example, be operated by one or more operators that the user of SIP device 104 wishes to communicate with. The one or more operators may create one or more greeting recordings, and may associate the greeting recordings with codes. For example, an operator may record a greeting in English, and another greeting in Spanish, and may associate the English greeting with a code, and may associate the Spanish greeting with a different code. The decoding system may use the English code and Spanish code to play the appropriate greeting.

The encoding system 110 may interface with a decoding system 116 by communicating with the decoding system 116 via a network. The network 108 may be the same network as network 114, or network 108 may be a different network than network 114. If network 108 and network 114 are the same network, then SIP device 104, encoding system 110, decoding system 116, SIP element 118, and SIP element 120 may interface with the same network. For example, each of the elements described may interface with the Internet, either directly or through one or more gateways and/or routers.

Network 108, network 114, and telephone network 122 may be a wireless network, a wired network or any combination of wireless network and wired network. For example, network 108, network 114, and telephone network 122 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, network 108, network 114, and telephone network 122 may include, without limitation, telephone line, fiber optics, IEEE Ethernet 802.3, a wide area network ("WAN"), a local area network ("LAN"), or a global network such as the Internet. Also, network 108, network 114, and telephone network 122 may support an Internet network, a wireless communication network, a cellular network, or the like, or any combination thereof. Network 108, network 114, and telephone network 122 may further include one, or any number of the exemplary types of networks mentioned above operating as a stand-alone network or in cooperation with each other. Network 108, network 114, and telephone network 122 may utilize one or more protocols of one or more network elements to which it is communicatively coupled. Network 108, network 114, and telephone network 122 may translate to or from other protocols to one or more protocols of network devices. Although each of network 108, network 114, and telephone network 122 are depicted as one network, it should be appreciated that according to one or more embodiments, network 108, network 114, and telephone network 122 may comprise a plurality of interconnected networks, such as, for example, a service provider network, the Internet, a broadcaster's network, a cable television network, corporate networks, and home networks.

Network elements 104, 106, 110, 112, 114, 116, 118, and 120 may transmit and receive data to and from network 108, network 114, and/or telephone network 122 representing broadcast content, user request content, parallel search queries, parallel search responses, and other data. The data may be transmitted and received utilizing a standard telecommunications protocol or a standard networking protocol. For example, one embodiment may utilize Session Initiation Protocol ("SIP"). In other embodiments, the data may be transmitted and/or received utilizing other Voice Over IP ("VoIP") or messaging protocols. For example, data may also be transmitted and/or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving broadcast or parallel search data. Data may be transmitted and received wirelessly or may utilize cabled network or telecom connections such as an Ethernet RJ45/Category 5 Ethernet connection, a fiber connection, a traditional phone wireline connection, a cable connection or other wired network connection. Network 108, network 114, and telephone network 122 may use standard wireless protocols including IEEE 802.11a, 802.11b and 802.11g. Network 108, network 114, and telephone network 122 may also use protocols for a wired connection, such as an IEEE Ethernet 802.3 protocol.

Network elements 104, 106, 110, 112, 114, 116, 118, and 120 may include one or more processors (not shown) for recording, transmitting, receiving, and storing data. Although network elements 104, 106, 110, 112, 114, 116, 118, and 120 are depicted as individual elements, it should be appreciated that the contents of one or more of network elements 104, 106, 110, 112, 114, 116, 118, and 120 may be combined into fewer or greater numbers of devices and may be connected to additional devices not depicted in FIG. 1.

Figure 2:
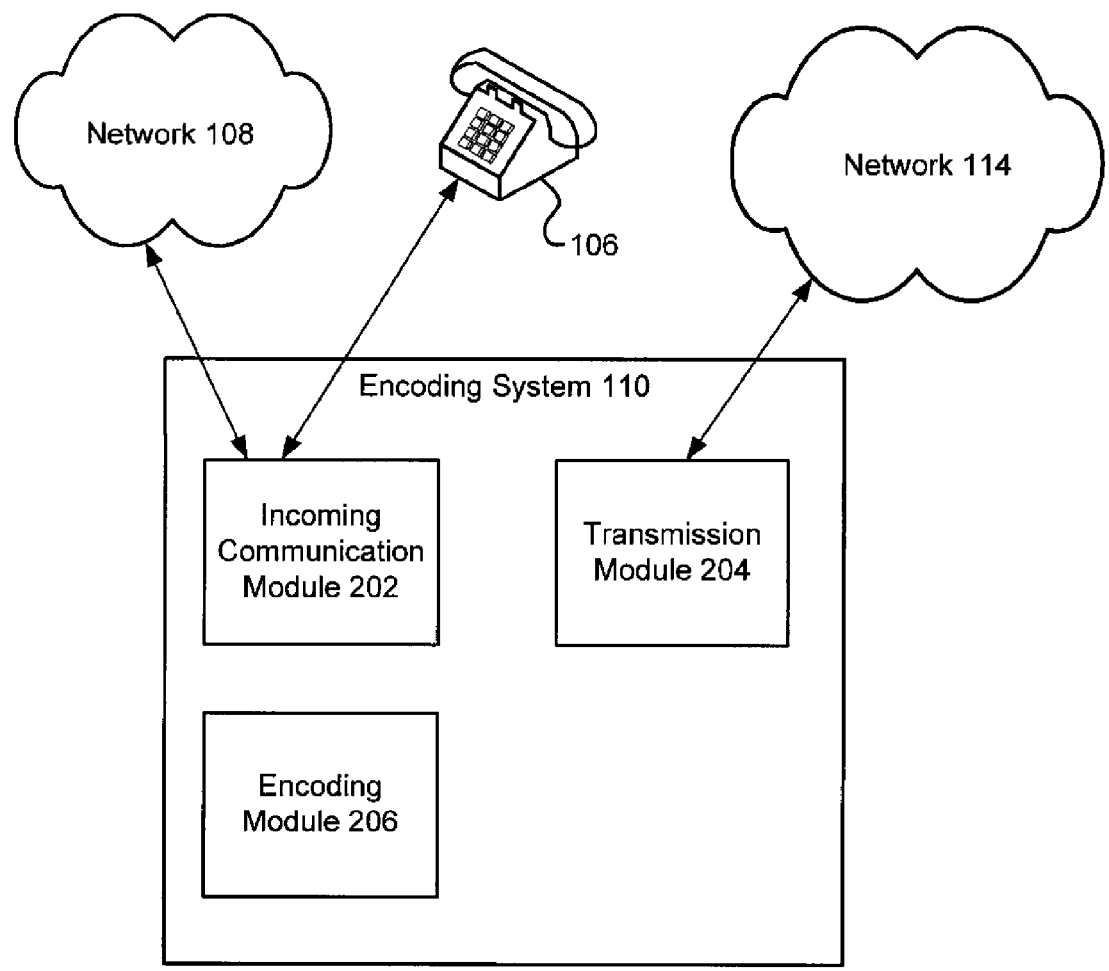
FIG. 2 is a block diagram of encoding system components of the system of a particular embodiment.

FIG. 2 is a block diagram of encoding system 110 components of the system of a particular embodiment. The encoding system 110 may include an incoming communication module 202, an encoding module 206, and a transmission module 204.

The incoming communication module 202 may be operable to receive incoming communications from one or more sources. For example, the incoming communication module 202 may be operable to receive incoming communication from a VoIP device, or the incoming communication module 202 may be operable to receive incoming communication from a telephone or wireless telephone over a telephone network. In the embodiment of FIG. 2, a VoIP device communicating with the incoming communication module 202 via a network and a telephone communicating with the incoming communication module 202 via a telephone network are shown. Additional devices may also be in communication with the incoming communication module 202, either in parallel or in serial connection to the incoming communication module 202, and additional devices with other communication protocols may be employed to communicate with the incoming communication module 202. In another embodiment, the devices may communicate with the SIP server 112, and the encoding system 110 may interface with the ST server 112.

The encoding module 206 may be operable to encode information into a SIP header, or to generate a SIP request with additional information included in the SIP header. The encoding module 206 may also be operable to transmit information to a user via the network and/or the telephone. For example, and without limitation, the encoding module 206 may communicate a pre-recorded voice informational, such as a greeting, or a pre-recorded video informational, may utilize one or more operators to communicate live or on delay, or may communicate machine-readable data to the telephone or the VoIP device. The encoding module 206 may also be operable to receive information from the telephone or the VoIP device. The information may be in the form of a voice, one or more key tones that may be interpreted as a key strike on a telephone, or data from a VoID device. If the information is in the form of a voice, interactive voice response ("IVR") may be used to translate the voice information into data. For example, a voice communication of "one" may be translated into data as the number "1." For example, and without limitation, the encoding module 206 may play and/or otherwise transmit a greeting to a user, such as "Welcome to Store X. Please press '1' to continue in Spanish, or press '2' to continue in English." The encoding module 206 may be operable to receive the communication of either "1" or "2" over the device that is connected to the incoming communication module. The encoding module 206 may take the information supplied by the user and encode a SIP header with the information. For example, if the user pressed "1" to continue the conversation in Spanish, the encoding module 206 may encode a "1" into the SIP header corresponding to the SIP request for that particular user, or may encode "Spanish," or another language code to identify the user as requesting to continue the conversation in Spanish.

The transmission module 204 may be in communication with the network 114. The transmission module 204 may transmit information to other systems via the network 114, and may receive information from other systems via the network 114.

Figure 3:
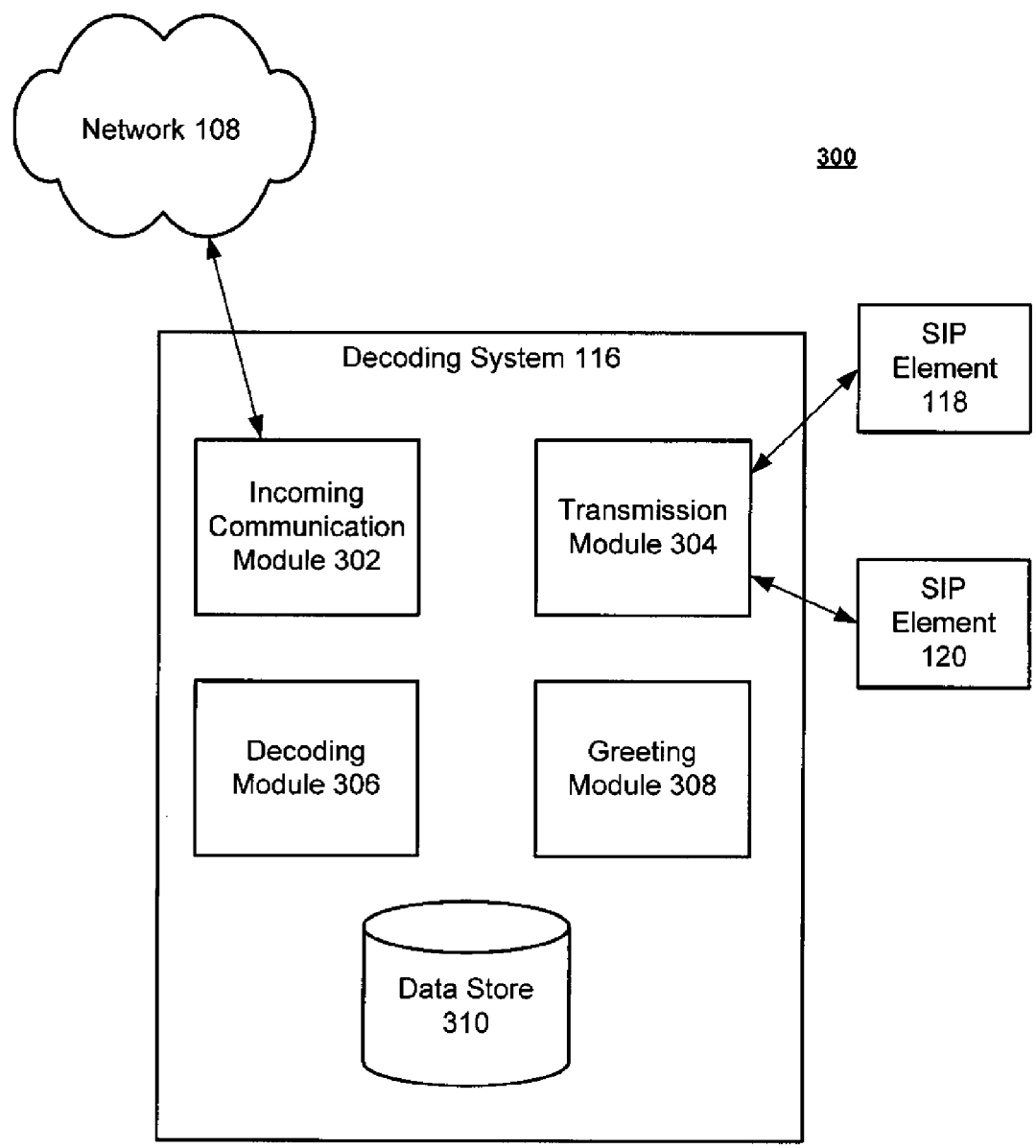
FIG. 3 is a block diagram of decoding system components of the system of a particular embodiment.

FIG. 3 is a block diagram of decoding system 116 components of the system of a particular embodiment. The decoding system 116 may include an header incoming communication module 302, a transmission module 304, a decoding module 306, a greeting module 308, and a data store 310.

The incoming communication module 302 may be operable to receive SIP requests, or SIP header information corresponding to one or more SIP requests, from the network 114.

The decoding module 306 may be operable to receive the SIP header and retrieve information from the SIP header, or may be operable to retrieve information from the header of a SIP request. According to the example shown in FIG. 2, the decoding module 306 may be operable to retrieve the language code from the SIP header. The decoding module 306 may then transmit the information retrieved from the SIP header, in the example the language code information, for further processing.

Data store 310 may be network accessible storage and may be local, remote, or a combination thereof to network elements 104, 106, 110, and 112. Data store 310 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, Data store 310 may be a database, such as an Oracle database, a Microsoft SQL Server database, a DB2 database, a MySQL database, a Sybase database, an object oriented database, a hierarchical database, or other database. Data store 310 may utilize flat file structures for storage of data. The data store 310 may, for example, store one or more greetings associated with one or more language codes. The greetings may, for example, be in the form of files that may be transmitted to the SIP device 104 so that a user utilizing the SIP device 104 may perceive the greeting. For example, the user may receive a voice greeting, or a text greeting, or a picture and/or video greeting.

The greeting module 308 may be operable to retrieve one or more greetings stored in the data store 310 based on the information retrieved from the SIP header by the decoding module 306. The greeting module 308 may transmit the greeting to the SIP server 112 and/or the SIP device 104.

The transmission module 304 may interface with SIP element 116 and SIP element 118. The transmission module 304 may, for example, transmit the SIP request to SIP element 116 and/or SIP element 118 based on the SIP header information, or based on other information.

In another embodiment, a decoding system 116 is associated with a SIP element, so that SIP element 116 has a decoding system 116, and SIP element 118 has a decoding system 116. The SIP server 112 may route SIP requests to one or more SIP elements, and each SIP element may include a decoding system 116 for examining SIP header information and, according to the present example, playing an appropriate greeting.

The encoding system 110, the decoding system 116, and the SIP server 112 may include one or more processors (not shown) for recording, transmitting, receiving, and storing data. The encoding system 110, the decoding system 116, and the SIP server 112 may transmit signals to the network 108 and/or the network 114, receive signals from the network 108 and/or the network 114, and store and access data from associated data stores. The encoding system 110, the decoding system 116, and the SIP server 112 may be similar or identical combinations of hardware and/or software, or may include different hardware and/or software. The encoding system 110, the decoding system 116, and the SIP server 112 may be electronically controlled using instructions embodied in software, or may be controlled using instructions embodied in hardware, or a combination of software and hardware may be used to operate the encoding system 110, the decoding system 116, and the SIP server 112.

Figure 4:
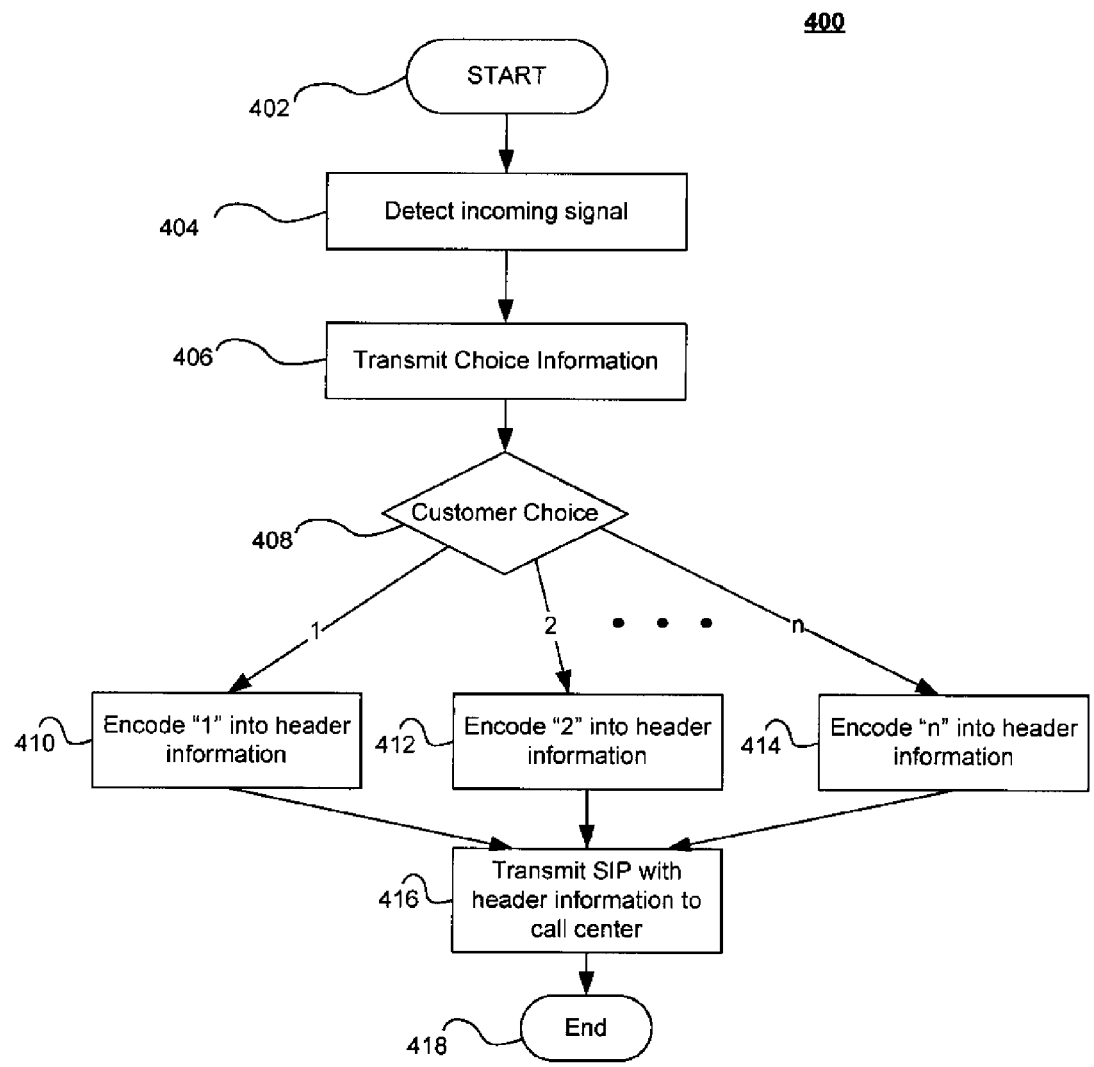
FIG. 4 is a flowchart illustrating the functionality of encoding customer choices in a header for transmission.

FIG. 4 is a flowchart illustrating the functionality of encoding customer choices in a header for transmission. The method 400 may begin at step 402. At step 404, the SIP server 112 and/or the encoding system 110 may detect an incoming signal. The incoming signal may be, for example, an incoming SIP request. The SIP request may contain header information, or may not contain header information. The encoding system 110 may analyze the incoming SIP request for header information. If header information is found of the type that the encoding system 110 may add to the header, then the encoding system 110 may transmit the SIP request to the SIP server 112 and end the method 400. For example, the SIP device 104 may have already encoded the SIP request header with information that the encoding system 110 may seek to add to the header.

If header information does not exist, or if header information exists, but it is not of the type that the encoding system 110 may add to the header, then the encoding system 110 may request information from the user of the SIP device 104, or of the SIP device 104, by transmitting information to the SIP device 104 in step 406. The information may be, for example, a voice greeting requesting that the user enter information according to one or more preferences. For example, the user may be requested to enter or speak "1" into the SIP device 104 to receive a greeting in Spanish, or enter or speak "2" to receive a greeting in English. The request may be transmitted, and the response may be received, through the network 108 and/or the SIP server 112. The request and the response may, for example, be in the form of one or more data packets sent to and received from the network 108.

The encoding system 110 may receive the information from the user regarding the choice in step 408. Based on the response, the encoding system 110 may encode information into the header of the SIP request. For example, if the user indicated that the user preferred to receive a greeting in Spanish by speaking or pressing "1," In step 410, the encoding system 110 may interpret the response from the user by encoding a "1" in one or more specific portions of the SIP header associated with the SIP request, or may encode another code to indicate that the user wished to receive a greeting in Spanish. If the user indicated that the user preferred to receive a greeting in English by speaking or pressing "2," indicated in step 412, the encoding system 110 may interpret the response from the user by encoding a "2" in one or more specific portions of the SIP header associated with the SIP request, or may encode another code to indicate that the user wished to receive a greeting in English. Of course, the method may include more than two options, and any number of options are contemplated. If the user indicated that the user preferred to receive a greeting in another language, an error occurred, or another condition was met, the encoding system 110 may encode another value into the SIP header associated with the SIP request, in step 414.

In step 416, the encoding system 110 transmits the SIP request, with information included in the SIP header associated with the choice that the user made, to the SIP server 112. The method may end at step 418. The SIP server 112 may receive the SIP request, and may transmit the SIP request to one or more SIP elements, or other elements associated with the network 114, as appropriate.

Figure 5:
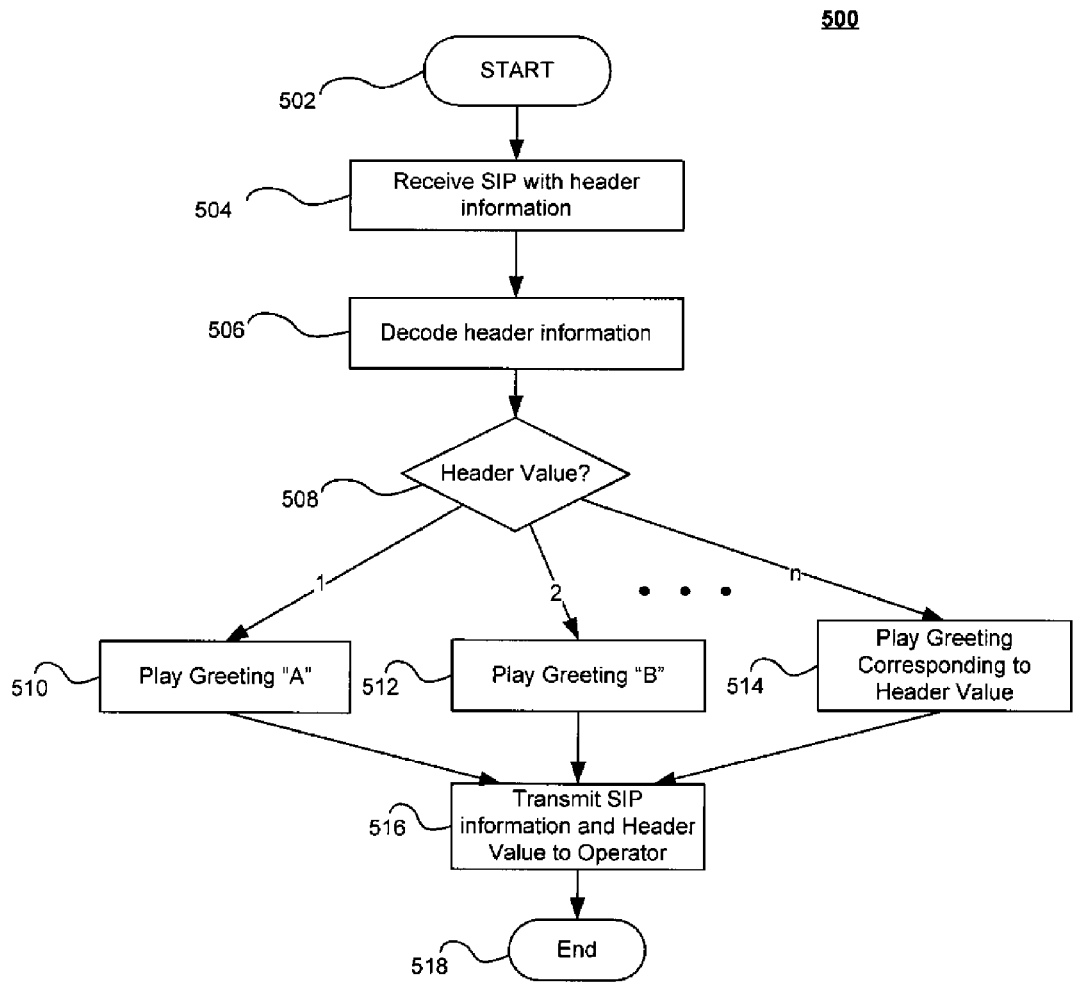
FIG. 5 is a flowchart illustrating the process of receiving the transmission from FIG. 4, decoding the transmission, and acting on the decoded transmission in the exemplary context of greeting information.

FIG. 5 is a flowchart illustrating the process of receiving the transmission from FIG. 4, decoding the transmission, and acting on the decoded transmission in the exemplary context of greeting information. The method 500 may start at step 502. In step 504, the decoding system 116 may receive a SIP request with header information provided by the SIP device 104 or encoded with the encoding system 110, and transmitted by the SIP server 112.

In step 506, the decoding system 116 may decode the SIP header, and may interpret the information. For example, the decoding system 116 may search one or more specific locations in the SIP header, or may search for one or more codes or terms in the SIP header, for the information.

In step 508, the decoding system 116 may utilize the information from the SIP header to take one or more actions corresponding to the information from the SIP header. For example, the decoding system 116 may transmit a specific greeting to the SIP device 104 depending on the information from the SIP header. The decoding module 306 may decode the SIP header and play a greeting that is associated with the specific code encoded in the SIP header.

If, for example, the SIP header indicated a "1," then the decoding system 116 may play greeting "A" in step 510. In the example shown in FIG. 4, the encoding system 110 encoded a "1" into the SIP header to correspond to the user indicating that the user wished to receive a greeting in Spanish. The decoding system 116 may search the data store 310 for a greeting associated with the "1" code, and may transmit greeting "A," associated with the "1" code, that conveys a greeting in Spanish.

If, for example, the SIP header indicated a "2," then the decoding system 116 may play greeting "B" in step 512. In the example shown in FIG. 4, the encoding system 110 encoded a "2" into the SIP header to correspond to the user indicating that the user wished to receive a greeting in English. The decoding system 116 may search the data store 310 for a greeting associated with the "2" code, and may transmit greeting "B," associated with the "2" code, that conveys a greeting in English.

Of course, the decoding system 116 is not limited to two actions based on two responses. If, for example, the SIP header indicated a different value, or the SIP header did not indicate a value, then the decoding system 116 may transmit an associated greeting in step 514.

In an alternate embodiment, the decoding system 116 may decode more than one code from the SIP header. The decoding system 116 may decode some or all of the codes from the SIP header, and may take action corresponding to the codes from the SIP header. For example, the decoding system 116 may transfer the SIP request to one or more other systems on the network 114, or may transmit additional information to the SIP device 104, SIP server 112, and/or SIP elements based on the codes from the SIP header.

In step 516, the decoding system 116 may transmit the SIP request to SIP element 116 and/or SIP element 118. The method may end at step 518.

In another embodiment, the decoding system 116 may transmit the SIP request to one or more of the SIP elements based on the decoded SIP header information. For example, the SIP elements may have information corresponding to language capabilities. If the user indicated to the encoding module 206 that the user wished to receive a greeting in Spanish, and the encoding module 206 encoded that information in the SIP header of the associated SIP request, the decoding module 306 may decode the SIP header information and may transmit one or more appropriate greetings in Spanish for the user. The SIP elements may be associated with one or more languages, indicating language capabilities. For example, a SIP element may be associated with one or more specific language codes that indicate the operator operating the SIP element may be able to converse with the user in those one or more specific languages. If, for example, the user indicated the user would like to interact in Spanish, the decoding system 116 may route the SIP request to one or more SIP elements that are associated with Spanish language capabilities, or may route the SIP request to another SIP element if there are no SIP elements indicating a Spanish language capability, or if each of the SIP elements indicating a Spanish language capability are busy or otherwise unavailable. The decoding system 116 may also interact with the SIP device 104 and inquire if the user may interact in another language. The decoding system 116 may then route the SIP request corresponding to that user to one or more SIP elements corresponding to a Spanish language capability.

In another embodiment, an automatic call distributor ("ACD") may be used to route the SIP request appropriately, depending on one or more selections made by the user. For example, the user may be presented with one or more choices according to a pre-recorded or automated menu system. The user may choose among the possible selections, and may be routed to one or more SIP elements based at least in part on the selections that the user made. For example, the user may choose between being transferred to the billing department, the service department, or the new customer department. The choice may be assigned to a code, so that, for example, the user may press "1" to be transferred to the billing department, may press "2" to be transferred to the service department, or may press "3" to be transferred to the new customer department. The ACD system may route the SIP request according to the choices that the user makes when interacting with the system. Further depending on the SIP request associated with the user and encoded with the encoding system 110, the automatic call distributor may interact with the decoding system 116 to route the user's call to one or more appropriate SIP elements based at least on the SIP request header information and the entries associated with the automatic call distributor. A user may also interact with a voice portal, in which the voice portal or other system may present the user with one or more options or choices, and the user may speak or otherwise intonate the option or choice as a response. The voice portal may identify the user's choice based on, for example, the user's tone or other speech pattern, and may route the SIP request according to the user's response. An ACD system or a voice portal system may be used with the encoding system 110 and/or the decoding system 116, or both an ACD system and a voice portal system may be used.

System and methods of an embodiment have been described in the exemplary context of an encoding system 110 and a decoding system 116 to play a greeting based on the preferences that the user specified to the encoding module 206. Of course, other embodiments may perform other tasks. For example, and without limitation, the encoding system 110 may request that the user input answer one or more questions, or input information. For example, the questions may pertain to the tasks that the user wishes to accomplish, or may pertain to other preferences the user wishes to make. Additional information may include, for example and without limitation, a credit card number or a unique user ID or a passcode. The answers to the questions, or the information provided by the user, are encoded into a SIP header associated with the SIP request, and the SIP request with encoded information in the SIP header, is transmitted to a SIP server 112 and to a decoding system 116, where the information is decoded, and further action is taken.

Also, while a SIP request is shown as an example, it should be noted that other protocols may be used. For example, and without limitation, the H.323 protocol may be used, and header information may be included in a UUI field. Other protocols may also be used. Further, one or more protocols may be used by an embodiment at the same time. A protocol may include a data header for storing information separate from the data payload of the protocol. Additional information, such as a language preference, may be stored in the data header of a protocol request.

It is to be appreciated that the set of instructions, e.g., the software, that configures the computer operating system to perform the operations described above may be contained on any of a wide variety of media or medium, as desired. Further, any data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by a computer.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

We claim:

1. A method, comprising:
   receiving an incoming communication including one or more data headers;
   requesting a spoken language preference from a user;
   encoding at least one of the one or more data headers with header information indicating the spoken language preference information into a data transmission protocol;
   receiving the encoded data transmission protocol;
   routing the encoded data transmission protocol using an automatic call distributor based at least on interaction with a decoding system or interaction from the user;
   decoding, using an electronic processor, the at least one of the one or more data headers that indicates the spoken language preference; and
   performing an action based at least on the one or more data headers indicating the spoken language preference wherein the action comprises playing or transmitting a greeting in the spoken language preference.

2. The method of claim 1, wherein the one or more data headers are associated with a protocol request.

3. The method of claim 2, wherein the protocol request is SIP.

4. The method of claim 2, wherein the protocol request is H.323.

5. A non-transitory computer readable media comprising code to perform the acts of the method of claim 1.

6. The method of claim 1, wherein using an electronic processor to decode comprises searching for one or more locations or one or more codes in each of the one or more data headers.

7. The method of claim 1, wherein the action further comprises routing the incoming communication to an element corresponding to the spoken language request.

8. The method of claim 1, further comprising:
   receiving an input from a user in response to the action.

9. The method of claim 1, wherein the action further comprises playing a message in a language corresponding to the spoken language preference.

10. The method of claim 1, further comprising:
    searching a data store for a data entry corresponding to the spoken language preference.

11. A system, comprising:
    at least one non-transitory computer readable media for storing codes; and
    at least one programmable processor configured execute the codes to perform:
      receiving one or more protocol requests, the one or more protocol requests including one or more headers, and requesting spoken language preference information from a user and encoding the one or more headers of the one or more protocols with header information indicating the spoken language preference information into a data transmission protocol; and
      receiving the data transmission protocol subsequent to the encoding and decoding the header information, and thereby receiving the spoken language preference information, and taking one or more actions based on the spoken language preference wherein the one or more actions comprise playing or transmitting a greeting in the spoken language preference; and
    an automatic call distributor to route the data transmission protocol to one or more appropriate decoding modules, based on interaction from the user with the automatic call distributor.

12. The system of claim 11, wherein the one or more protocol requests are from data according to a voice over Internet protocol.

13. The system of claim 11, wherein the one or more protocol requests are from a telephone network.

14. The system of claim 11, wherein the data transmission protocol is SIP.

15. The system of claim 11, wherein the data transmission protocol is H.323.

* * * * *